United States Patent
Wang et al.

[11] Patent Number: 6,129,278
[45] Date of Patent: Oct. 10, 2000

[54] DETECTING IMAGE CELL POSITION WITH SUBPIXEL ACCURACY

[75] Inventors: Ynjiun P. Wang; Paul Pay-Lun Ju, both of Fort Myers, Fla.

[73] Assignee: Metanetics Corporation, Fort Myers, Fla.

[21] Appl. No.: 08/245,613

[22] Filed: May 19, 1994

[51] Int. Cl.$^7$ ............................................. G06K 7/10
[52] U.S. Cl. ............................. 235/462.01; 382/199
[58] Field of Search .............................. 235/463, 462, 235/462.01; 348/625; 382/199

[56] References Cited

U.S. PATENT DOCUMENTS

| | | | |
|---|---|---|---|
| 4,720,745 | 1/1988 | DeForest et al. | 348/448 |
| 5,286,960 | 2/1994 | Longacre et al. | 235/463 |
| 5,296,690 | 3/1994 | Chandler et al. | 235/462 |
| 5,329,105 | 7/1994 | Klancnik et al. | 235/463 |
| 5,378,883 | 1/1995 | Batterman et al. | 235/472 |

*Primary Examiner*—David P. Porta
*Assistant Examiner*—Mark Tremblay
*Attorney, Agent, or Firm*—Kenneth P. Robinson

[57] ABSTRACT

By providing subpixel accuracy in the detection of the position of an element of a pixel data image, the invention makes possible reductions in scanner and storage resolution of the order of 65 percent or greater for two-dimensional applications. Methods use normalized gray level values to determine the extent of coverage of an image cell by individual pixels. By then applying such gray level values of a plurality of successive pixels to a preconstructed lookup table, ambiguities are resolved to determine the position of cell edges. The cell edge data can be used to determine cell position or used directly in edge-based bar code decoding techniques. Cell position data is used for construction of a virtual image of a bar code or other dataform of interest and virtual image information may then be used for purposes of decoding the bar code or other dataform. For two-dimensional applications, the gray level values of a plurality of successive pixels, as referred to, may be implemented as a sliding window of three such gray level values along successive lines in a first dimension which are applied to a lookup table, followed by repetition for successive lines in a perpendicular dimension, to derive cell edge data for both dimensions.

24 Claims, 3 Drawing Sheets

DETECTING IMAGE CELL POSITION WITH SUBPIXEL ACCURACY

This invention relates to determining the position of an element represented in a pixel data image and, more particularly, to detecting the positions of cells of machine readable dataforms, such as bar codes and matrix codes, with subpixel accuracy.

BACKGROUND OF THE INVENTION

The use in diverse applications of bar codes (one-dimensional, such as UPC, Code 39, Code 128; two-dimensional, such as PDF 417, Code 49, Code 16K; etc.), matrix codes (Data Code, Code 1, Vericode, MaxiCode, etc.) and graphic codes (Glyph, etc.) which may be printed or etched on paper, plastic cards and metallic and other items is well known. In addition to such optically machine readable graphics, data is commonly recorded in other machine readable forms, such as optically via invisible ink bar codes or matrix codes and magnetically via magnetic stripes or magnetic ink MICR fonts, on credit cards, checks and identification badges. Similarly, data is recorded electromagnetically via RF tags in a growing variety of forms and applications. Also, in the area of optical character recognition machine readable dataforms take the form of special OCR type fonts and MICR fonts, as well as text including words and numbers formed in the course of ordinary typing and word processing operations. In addition to printing, etching and magnetic recording, other methods of forming or transferring dataforms include engraving, ion doping (for semiconductor wafers), stamping, tattooing (for skin), biochemical binding, etc. For present purposes, all arrangements whereby data is fixed in some form of machine readable copy are termed "dataforms".

In the utilization of dataforms, the data originally encoded is recovered for further use in a variety of ways. For example, a printed bar code may be optically scanned to derive reflectance values which are digitized, stored in buffer memory and subsequently decoded to recover the data encoded in the bar code. Thus, regardless of the particular type of dataform, an image is typically acquired and stored as pixel data for further processing. An image of a bar code or matrix code existing as a graphic image can be acquired by use of a CCD scanner, a laser scanner, a CMOS camera, or other suitable device. For a dataform recorded in a magnetic strip, invisible ink or other medium, magnetic and other techniques available for use with such dataforms are effective for reading the dataform in order to acquire pixel data representative of the elements of the dataform which represent encoded data. The resulting pixel data is stored in an image buffer memory or other medium in bit map or other form which, while representative of a pixel data image, may utilize any appropriate data storage format.

The resolution capabilities, and thereby the cost, of the scanning device or other sensor, as well as the data storage medium, are directly dependent upon the resolution required in the overall decoding process. On a basic level, the resolution characterizing both the pixel data image acquisition and storage must be adequate to permit detection of the position of the smallest image element of interest. For present purposes, the smallest image element of interest is termed a "cell". If, for example, the width of a cell is many times larger than the size of a pixel within the acquired pixel image, it will be appreciated that such cell width will be represented by many pixels and its position will be correspondingly easy to detect. Thus, the resolution, which may be measured in pixels-per-cell, will be high relative to the cell width. Conversely, if a cell dimension is smaller than the size of one pixel in the pixel data image it will not be possible to detect the cell position with accuracy adequate to enable reliable recovery of data encoded in the dataform.

Established sampling theory holds that an image of the present type can be unambiguously represented by samples of the image so long as the image contains no elements or features representative of spatial frequencies greater than one-half the sampling frequency. For present purposes, this translates to a requirement that the width of the cell previously referred to must be no smaller than the dimension represented by two side-by-side pixels in the pixel image. This is another way of expressing the current state of the art standard for bar code decoding, which holds that detecting of a bar code or other dataform requires, as a minimum, at least two pixels-per-cell along one axis. This state of the art minimum requirement is illustrated in FIG. 1a, which shows bar code cells and the pixel size relationship for a few pixels within an overall image. The individual pixels may be in any lateral positioning relationship with the bar code cells and the provision of a least two pixels-per-cell enables determination of the relative cell positions to permit decoding. For the two-dimensional case, as for cells of a matrix code dataform wherein both lateral and vertical positioning of square cells are employed for encoding data, state of the art detecting requires a resolution of at least two pixels per cell along two perpendicular axes, which equates to four pixels-per-cell. This is illustrated in FIG. 1b.

Thus, for a one-dimensional (1-D) laser scanner, CCD scanner or CMOS camera, if a cell width of 0.1 inch is to be detected, for example, the required resolution must be represented by a pixel size no greater than 0.05 inch. For a two-dimensional (2-D) laser scanner, CCD scanner or CMOS camera the same resolution/maximum pixel size requirement applies in each dimension, resulting in the four pixel-per-cell requirement. To achieve the desired decoding resolution, the storage or memory medium must have at least the same resolution capability of storing at least two pixels-per-cell for one axis and four pixels-per-cell for the 2-D case. These standards, together with the overall size and image cell content of a complete dataform to be decoded, determine the overall size, resolution and cost of the sensor unit and storage medium necessary to acquire and store the pixel data image.

As examples of prior patents which describe machine readable dataforms and systems for coding and decoding such dataforms, attention is directed to the following. U.S. Pat. Nos. 5,113,445 and 5,243,655 cover two-dimensional bar code coding and encoding inventions of a present inventor. Earlier U.S. Pat. No. 4,939,354 covers production and reading of two-dimensional data code matrices.

Objects of the present invention are to provide new and improved methods for detecting the position of an image element represented in a pixel data image, and to provide such methods operable with resolutions lower than two pixels-per-cell, thereby achieving subpixel accuracy in cell position detection.

SUMMARY OF THE INVENTION

In accordance with the invention, a method for detecting the position of a cell which is an element of a machine readable dataform, comprises the steps of:

(a) acquiring a pixel data image of the dataform, including such cell;

(b) determining a pixels-to-cell nominal resolution of the pixel data image;

(c) normalizing the resolution of the pixel data image by one of the following (i) reducing the nominal resolution to a pixels-per-cell target resolution in the range of 1.0 to 1.2 pixels-per-cell, and (ii) if the nominal resolution corresponds to such target resolution, stabilizing the nominal resolution at the target resolution;

(d) determining a normalized gray level value for each of a plurality of successive pixels along a first axis crossing the cell, including cell coverage pixels having gray level values representative of the presence of the cell, the gray level values of the cell coverage pixels representing data as to the complementary portions of the area of each cell coverage pixel respectively inside and outside the area of the cell in the pixel data image;

(e) utilizing the step (d) normalized gray level values for successive groupings of three successive pixels along the first axis to determine, for each cell coverage pixel, the order of its complementary inside and outside portions along the first axis in a reference direction and to derive normalized cell edge position data;

(f) deriving cell position data for the cell using the step (e) normalized edge position data;

(g) repeating steps (d), (e) and (f) for additional elements of the dataform, some of which may comprise a plurality of cells;

(h) utilizing the cell position data from step (f) to provide a virtual image of the dataform; and (i) decoding the virtual image to provide output signals representative of data originally encoded in the dataform.

For a better understanding of the invention, together with other and further objects, reference is made to the accompanying drawings and the scope of the invention will be pointed out in the accompanying claims.

DESCRIPTION OF THE INVENTION

A method for detecting the position of a cell represented in a pixel data image will be described with reference to the FIG. 2 flow chart. As a specific example, consideration is directed to detecting the position of a cell of a bar code dataform consisting of a printed graphic image of a lateral series of black (low reflectance) and white (high reflectance) vertical bar elements. Each such element, whether black or white can be one or a plurality of cell widths in lateral width, a cell representing the smallest dimension (width in this case) of interest. Data is encoded in the original formation of the bar code image by choice of the number of cell widths represented by the width of each successive black and white bar of the complete bar code. It will thus be appreciated, that if a method incorporates pixel data image acquisition and storage resolution capabilities adequate to detect the position of a single cell width, such resolution capabilities will be adequate to also detect the position of wider image elements, including elements having widths which are multiples of the width of a single cell.

Figure 1A:
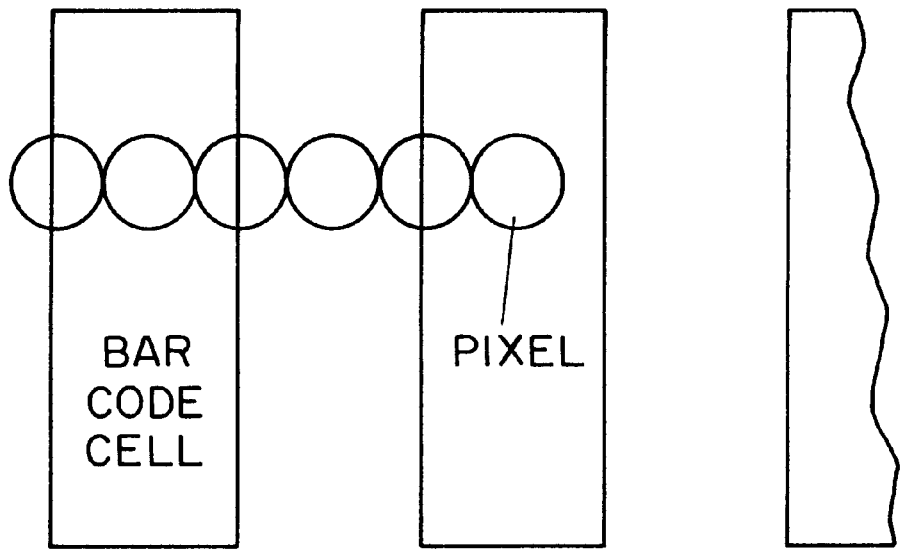
FIGS. 1a and 1b are illustrations useful in describing prior art resolution requirements.
Figure 1B:
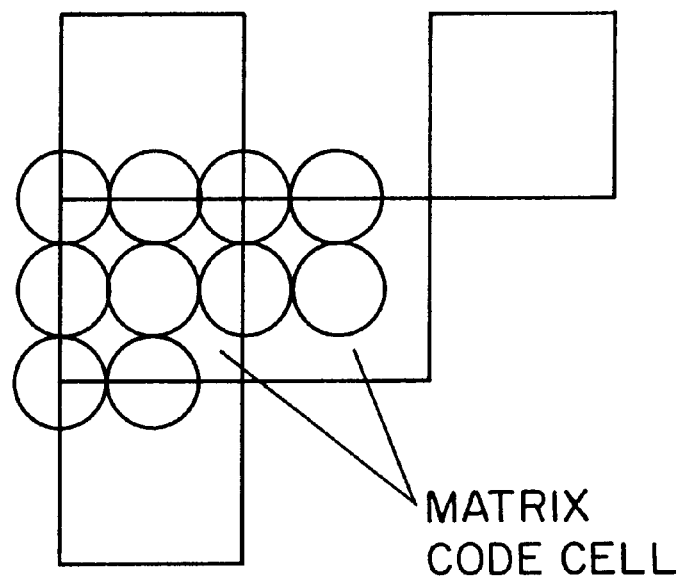
Figure 2:
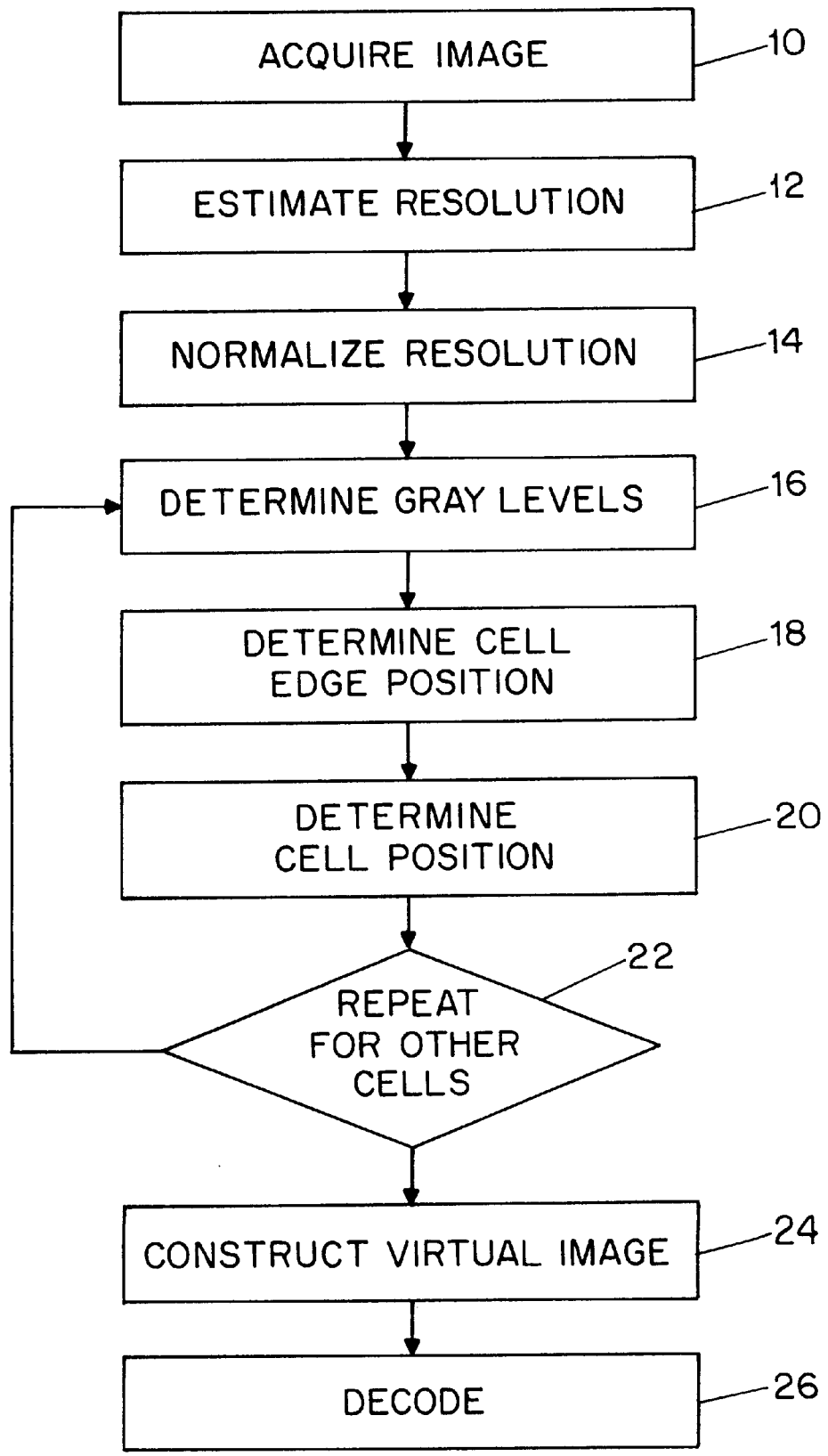
FIG. 2 is a flow chart illustrating steps of a method for detecting cell position in accordance with the invention.

In FIG. 2, step 10 comprises acquiring a pixel data image including a representation of a cell. The pixel data image may be acquired by scanning a bar code, converting reflective data into digitized electrical signals and storing such signals as a bit mapped image or in other suitable manner as discussed above. The resulting pixel data image will typically be an image of the entire 1-D or 2-D bar code. For purposes of description attention will be directed to detecting the position of a single cell. With an understanding of the invention in the context of a single cell, skilled persons will be enabled to extend application to an entire image, such as a bar code, in one or two dimensions as appropriate.

In step 12 the size of the cell in the acquired pixel data image (e.g., cell width) is determined on a suitable estimated or other basis in order to determine the pixels-per-cell nominal resolution of the pixel data image. As used herein, "nominal" refers to an estimation of a particular value to an accuracy of about plus or minus twenty percent. Such determination of resolution on the basis of pixels-per-cell can be carried out utilizing known techniques based upon spatial domain, time domain or frequency domain information regarding the acquired pixel data image to determine the number of pixels per the cell dimension.

Step 14 comprises normalizing the resolution of the pixel data image by one of the following: (i) reducing the nominal resolution determined in step 12 to a pixels-per-cell target resolution corresponding to a selected value less than 2.0 and greater than 1.0 pixels-per-cell, and (ii) if said nominal resolution corresponds to the selected value, stabilizing the nominal resolution of the pixel data image at the target resolution. Thus, if the nominal resolution initially corresponds to the selected value, no resolution reduction as in (i) is necessary. As will be described further with reference to FIG. 3, the present invention enables cell position detection with pixels-per-cell resolution lower than the current state of the art requirement of at least 2.0 pixels-per-cell, provided such resolution is at least 1.0 pixels-per-cell. For example, in step 14 the target resolution may correspond to a selected value of 1.2 pixels-per-cell. With selection of this target resolution, if the nominal resolution of the acquired pixel data image as determined in step 12 is two pixels-per-cell, or any value greater than 1.2 pixels-per-cell, the image resolution would be reduced to the selected value of 1.2 pixels-per-cell in substep (i) of step 14. If, however, in step 12 the nominal resolution is determined to correspond to the selected value of 1.2 pixels-per-cell, the nominal image resolution would simply be stabilized (e.g., left at that value without change). The remaining possibility is that the nominal resolution is determined in step 12 to be less than the selected value of 1.2 pixels-per-cell. In this case the acquired pixel data image has a resolution which is below the value selected for this example for decoding of the dataform, so that reacquisition of the image is probably necessary. Normalizing of the image resolution (e.g., reducing resolution from a value such as 4.8 to 1.2 pixels-per-cell, for example) can be carried out using known image processing techniques to down sample the acquired image to provide a lower resolution image. Thus, sampling a 4.8 pixels-to-cell image at a 4:1 ratio would provide a resulting pixel data image having a 1.2 pixels-per-cell image, assuming that is the target resolution selected in a particular application. As noted, in other applications the selected value may be lower than 1.2 pixels-per-cell, provided it is at least equal to 1.0 pixels-per-cell.

Figure 3:
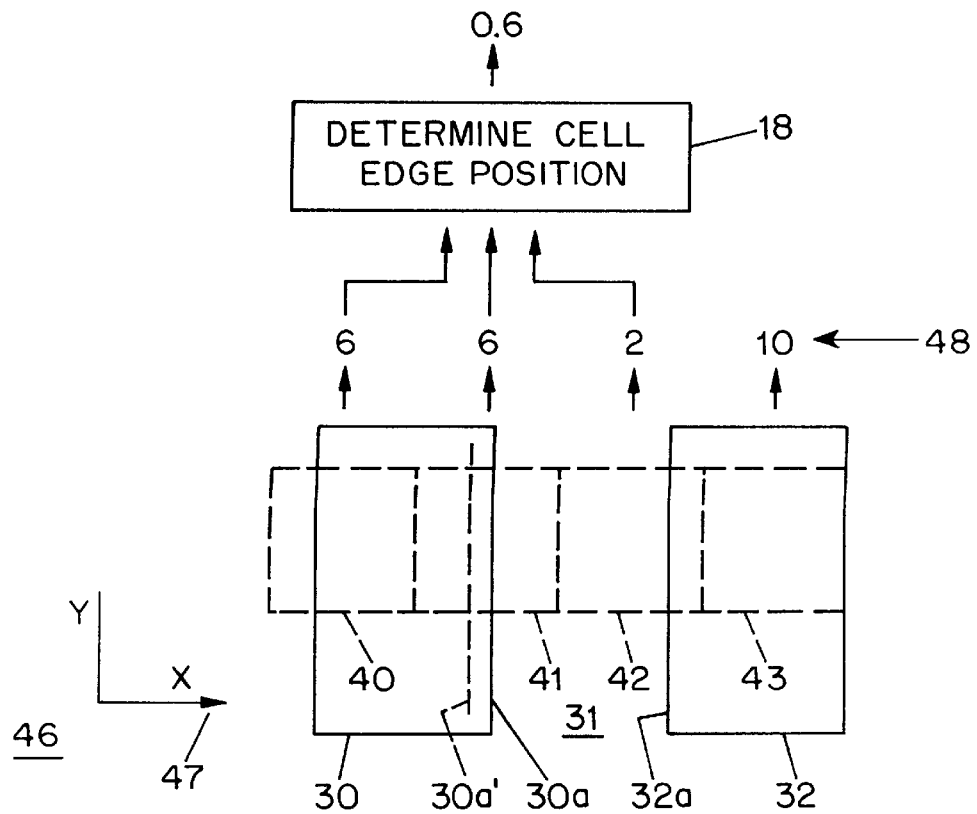
FIG. 3 is a diagram useful in describing steps of the FIG. 2 method.

In step 16 normalized gray scale values are determined for each of a plurality of successive pixels along a first axis, including cell coverage pixels. For this purpose, "cell coverage pixels" are defined as pixels having gray level values which are representative of a cell whose position is to be determined. With reference to FIG. 3, there are illustrated in simplified format a graphic representation of a portion of a bar code comprising low reflectance cells 30 and 32 separated by high reflectance cell 31 and, superimposed thereon, four pixels 40–43 which provide coverage for a limited portion of the cells 30–32 in the pixel data image. For purposes of this discussion, the pixels 40–43 are each shown as being square (e.g., represented by a square point spread function) so as to provide coverage of a square area of the bar code. As shown, in this example pixels 40–43 lie successively along axis X (indicated at 46) and pixels 40 and 41 are cell coverage pixels for cell 30. Gray level values are shown at 48 for each of pixels 40–43. The gray scale values of 6 for each of pixels 40 and 41 represent 60 percent coverage of cell 30 by each of the pixels 40 and 41. Similarly, pixels 42 and 43 are cell coverage pixels for cell 32, since the gray scale values of these pixels are representative of the presence and position of cell 32. While the preceding discussion is in the context of square pixels, any appropriate pixel shape, such as round, rectangular, hexagonal, etc., or point spread function can be utilized, with appropriate gray scale interpretation. Thus, a vertical cell edge crossing a circular pixel 75 percent of the distance across a diameter of the circle will not be represented by a 7.5 gray scale value, since the smaller part of the circle on one side of the cell edge will have an area much smaller than 25 percent of the circle. However, the gray scale values for circular or other pixels can readily be normalized for use for cell edge detection purposes.

Referring more particularly to pixel 41, it will be seen that its gray scale value of 6 represents the fact that there is a 60 percent portion of pixel 41 which is inside cell 30 (the "inside portion" of pixel 41 relative to cell 30). As a result, there is a complementary "outside portion" of pixel 41 which is outside of cell 30. The outside portion in this case is equivalent to 40 percent of pixel 41, since two complementary portions must together comprise 100 percent of the whole. With respect to a square pixel, such as 41, providing coverage across straight vertical cell edge 30a of cell 30, as shown in FIG. 3 in this example, a gray scale value of 6 indicates that the position of cell edge 30a lies 60 percent of the distance across pixel 41 along the X axis. However, this analysis based upon the gray scale value of pixel 41 does not provide enough data to enable determination of whether the edge of cell 30 lies 60 percent of the distance across cell 41 to the right (i.e., at the position indicated as 30a) or 60 percent of the distance across pixel 41 to the left (i.e., at the dotted position 30a'). Actually, dotted edge position 30a' represents the relationship of pixel 40 to cell 30, so that here is an ambiguity as to the actual position of pixel 41 relative to cell 30. This level of edge position data is thus subject to ambiguity.

Referring now back to FIG. 2, step 18 comprises utilizing the normalized gray scale values (from step 16) for successive groupings of a plurality of successive pixels along the X axis to determine for each cell coverage pixel the order of its complementary inside and outside portions along the X axis in a first direction and to derive normalized cell edge position data. In FIG. 3, pixels 40–42 form a grouping of a plurality of three successive pixels along the X axis in direction 47. As represented in FIG. 3, the normalized gray scale values for pixels 40–42 are utilized in step 18, which may comprise implementation of use of a preconstructed lookup table or equivalent form of decision tree. By use of such a lookup table or equivalent arrangement, it is readily determined that the three successive gray values of 6, 6 and 2, indicate that the 60 percent inside portion of cell coverage pixel 41 precedes the 40 percent outside portion of pixel 41 in direction 47. Therefore, since the 60 percent portion of pixel 41 is inside cell 30, the position of the left hand edge of cell 30 must be as shown at 30a (and not at 30a'). It will be appreciated that since low reflectance and high reflectance dataform cells are contiguously interspersed, the right edge of low reflectance (e.g., black) cell 30 is also the left edge of high reflectance (e.g., white) cell 31. Therefore, the next cell edge position to be located may be considered to be the left edge 32a of cell 32. By using a sliding window of the gray level values of three normalized pixels and the preconstructed lookup table, the position of cell edge 32a can now be determined in the same manner based upon use of the normalized gray level values of pixels 41–43. It will thus be seen that the cell edge positions are determined while utilizing a pixel data image resolution of only 1.2 pixels-per-cell by use of the invention in this example. While the normalized cell edge position data as derived in step 18 may be directly utilized in a variety of applications, the method in accordance with the invention which is here being described may additionally include the following steps.

With reference to FIG. 2, step 20 comprises deriving cell position data from the cell under consideration (e.g., cell 30) by use of the normalized edge position data derived in step 18. A currently preferred way of determining cell position, which may be defined in terms of the center of the cell, is by determination of the mid point between the two edges of the cell along an axis of interest.

In the context of decoding a complete dataform, such as a bar code, step 22 comprises repeating steps 16, 18 and 20 for additional elements of the bar code, some of which may be of widths comprising a plurality of cells. The preceding discussion has addressed detection of the position of a single cell (e.g., a dataform element having a width representing the minimum dimension of interest). However, a bar code typically includes elements which have widths equal to a plurality of cell widths (e.g., elements 5 cell widths wide) and the methods already described are equally applicable to elements having dimensions larger than the basic cell dimension described.

As represented in FIG. 2, step 24 comprises utilizing the cell position data from step 20 to provide a virtual image of the cell or complete dataform under consideration. The virtual image is constructed by assembling all of the cell position data for each of the elements of interest which are represented in the pixel data image.

In step 26 the virtual image provided in step 24 is decoded so as to recover data originally encoded in the dataform. An established protocol designed for decoding the particular type of dataform of interest may be used for this purpose. The decoded data may then be transmitted or otherwise used or processed for further usage, or the virtual image data may be so utilized prior to decoding and applied for further usage as appropriate.

With an understanding of the invention as described, methods in accordance with the invention may be applied for use in two-dimensional and other applications. In the described embodiment, a prior art 2 pixel-per-cell maximum resolution is reduced to a 1.2 pixel-per-cell resolution representing a 40 percent reduction in required scanner resolution and a corresponding 40 percent reduction in image buffer memory requirements, without introducing any significant reduction in overall cell position detection accuracy. For a corresponding two-dimensional application, sensor and storage reductions of 64 percent, representing a 1.2×1.2 pixel resolution versus a prior art 2×2 pixel resolution minimum, are provided. In other applications of the invention benefit may be taken of the fact that in accordance with the subpixel accuracy capabilities of the invention, the minimum pixels-per-cell resolution need only be marginally greater than 1.0 pixels-per-cell to enable use of a lookup function capable of resolving ambiguity in the order of the inside and outside portions with respect to a cell of interest, as discussed at length above.

Figure 4:
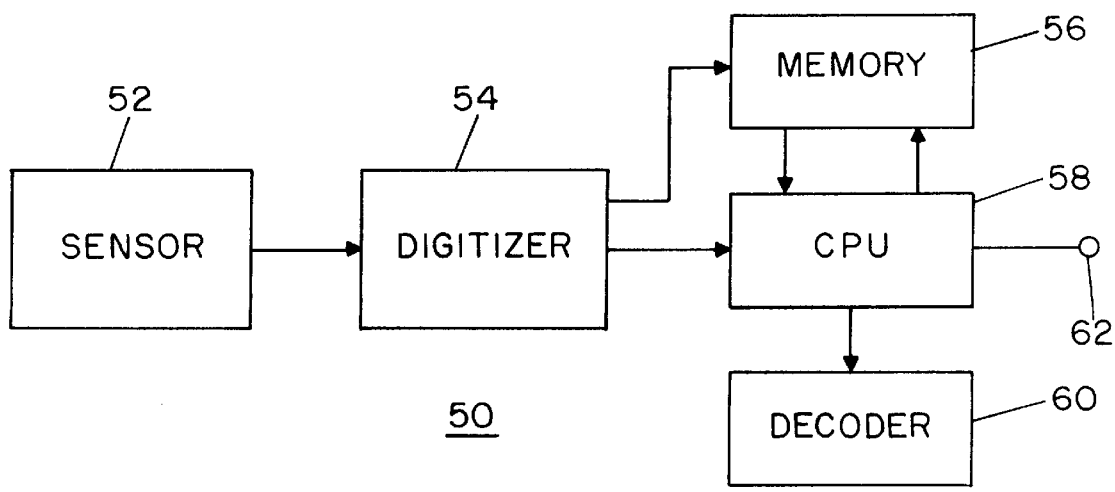
FIG. 4 is a block diagram of a system for utilizing the method of FIG. 2.

Referring now to FIG. 4 there is illustrated in simplified block diagram format, one form of system 50 for implementing methods in accordance with the invention. In system 50 sensor unit 52 is arranged to scan or read a dataform (which may exist as a graphic image or magnetically recorded data, for example) to provide a series of electronic signals or impulses. Sensor unit 52 may be any suitable type of device designed to read a dataform of interest. For reading a bar code or data code matrix, unit 50 may typically be a 1-D or 2-D laser scanner, CCD scanner or CMOS scanner. Digitizer unit 54 operates in known manner to convert the signals from sensor unit 52 into a series of binary data bits representing pixel image data for the dataform. Each data bit desirably has a binary numeric value representing the reflected light level, for example, so that the numeric value represents a gray level value. The gray level values may, for example, comprise a scale from 0 to 255, with 255 representing lowest reflectance (e.g., black element) and 0 representing highest reflectance (e.g., white element) in this example. The series of pixel image data from digitizer unit 54 is stored in memory unit 56 directly or under the control of central processing unit (CPU) 58. Storage may typically take the form of a bit mapped image, however, any suitable mode or form of storage may be employed.

In system 50 of FIG. 4, the method of detecting the position of a cell is primarily implemented by the use and operation of computer programming executed by CPU 58. Thus, utilizing the pixel image data stored in memory unit 56, the CPU is effective to determine nominal resolution and normalize resolution to a target resolution representing a selected value greater than 1.0 pixels-per-cell (e.g., the 1.2 pixels-per-cell resolution discussed above). The CPU then continues with the steps as described with reference to FIG. 2, by normalizing gray level values and determining cell edge positions. At this point, bar code decoding may go forward based upon the use of edge to similar edge decoding such as described in U.S. Pat. No. 5,243,655 with reference to the decoding of 2-D bar codes. Continuing the method as described above with reference to FIG. 2, CPU 58 is effective to determine cell positions based upon the middle point between cell edges. These steps are repeated as appropriate to derive cell edge/cell position data for all other elements of interest, under the control of CPU 58. The remaining steps of FIG. 2 may then be implemented by the CPU to construct a virtual image of the dataform or other item represented by the pixel image data. In the case of a dataform such as a bar code, decoding can then be performed in order to recover data originally encoded in the bar code. As shown in FIG. 4, decoding may be carried out in decoder unit 60, which may be remotely located. Alternatively, decoding may be carried out within CPU 58 with signals representative of the decoded data made available at output port 62 for coupling or transmission to a suitable utilization device, such as a CRT display, printer or central computer for further use. In other applications, the signals provided at output port 62 may represent data at any stage of the method described with reference to FIG. 2, such as cell edge position data as referred to above with respect to edge to similar edge bar code decoding. While system 50 is a new and useful system in accordance with the invention, the individual elements of the system as discussed can be provided by persons skilled in the art once they have gained an understanding of the invention.

The preceding discussion has focused on the example of application of the described methods in the decoding of dataforms. However, pixel data images may include elements representative of any form of image (e.g., a side view of a suspension bridge). Use of the invention permits acquisition and storage of an image at lower resolution, while still enabling accurate detection of the position of elements of the image (e.g., positions of the cables of the suspension bridge). Claim coverage is, therefore, not limited to use of the invention in the context of dataforms.

While there have been described the currently preferred embodiments of the invention, those skilled in the art will recognize that other and further modifications may be made without departing from the invention and it is intended to claim all modifications and variations as fall within the scope of the invention.

What is claimed is:

1. A method for detecting the position of a cell represented in a pixel data image, comprising the steps of:
    (a) acquiring a pixel data image including a representation of said cell;
    (b) determining a pixels-per-cell nominal resolution of said pixel data image;
    (c) normalizing the resolution of said pixel data image by one of the following (i) reducing said nominal resolution to a pixels-per-cell target resolution having a selected value, and (ii) if said nominal resolution corresponds to said selected value, stabilizing said nominal resolution at said target resolution;
    (d) determining a gray level value for each of a plurality of successive pixels along a first axis, including cell coverage pixels intersected by cell edge crossings, each said cell coverage pixel having a gray level value representing the position of said cell edge crossing subject to an ambiguity as to the order along said first axis of complementary pixel portions of said cell coverage pixel respectively inside and outside the area of said cell in said pixel data image;
    (e) utilizing the order and magnitudes of a sequence of said gray level values for a group of successive pixels along said first axis (i) to resolve said ambiguity to determine, for each said cell coverage pixel, the order of its said complementary inside and outside portions along said first axis and (ii) to derive cell edge position data;
    (f) deriving cell position data for said cell using step (e) cell edge position data; and
    (g) utilizing said cell position data from step (f) to provide a virtual image of said cell.

2. A method as in claim 1, wherein step (a) comprises acquiring an image of a cell of one of the following machine readable dataforms: a two-dimensional bar code; a matrix code.

3. A method as in claim 1, wherein: step (a) comprises acquiring a pixel data image of an entire machine readable dataform image; steps (d) through (f) are repeated for additional cells of said image; and step (g) provides a virtual image of said entire dataform image.

4. A method as in claim 3, additionally comprising the step of decoding said virtual image provided in step (g) to provide output signals representative of data originally encoded in said dataform.

5. A method as in claim 3, wherein said cell first referred to represents a minimum image dimension of interest and certain of said additional cells are included in image elements of larger dimensions.

6. A method as in claim 1, wherein said gray level values are determined on a scale of 0 to 255, and a gray scale value of 153 is correspondingly representative of a pixel which is 60 percent inside a low-reflectance cell and 40 percent outside said cell.

7. A method as in claim 1, wherein step (e) comprises utilizing said step (d) data for successive combinations of three successive pixels along said first axis for deriving normalized cell edge position data for each cell edge lying along said first axis.

8. A method as in claim 1, wherein step (b) comprises determining said pixels-to-cell nominal resolution along an axis which is nominally normal to one of the following: the bars of a bar code image; one side of a matrix code.

9. A method as in claim 1, additionally comprising repeating step (d) by determining a gray level value for each of a plurality of successive pixels along a second axis normal to said first axis; repeating steps (e) and (f) utilizing resulting data; and utilizing all resulting cell position data in step (g).

10. A method as in claim 1, wherein each pixel of said pixel data image has a basic shape which is one of the following: square, round, rectangular, hexagonal.

11. A method as in claim 1, additionally comprising the following step between steps (c) and (d):
   (x) normalizing gray level values for non-rectangular pixels to enable the gray level value for each said pixel to be correlated to gray level values for other pixels of said plurality of successive pixels.

12. A method as in claim 1, additionally comprising the following step between steps (e) and (f):
   (y) repeating step (e) for a second cell coverage pixel which is intersected by a second cell edge crossing of said cell.

13. A method for determining the position of an image cell, represented by cell edges between areas of high and low gray level values in a pixel data image, comprising the steps of:
   (a) determining a gray level value for each of a plurality of successive pixels of said image along an axis crossing said image cell, including a cell coverage pixel intersected by a cell edge crossing, said cell coverage pixel having a gray level value representing the position of said cell edge crossing subject to an ambiguity as to the order along said axis of complementary pixel portions of said cell coverage pixel respectively inside and outside of the area of said image cell in said pixel data;
   (b) resolving said ambiguity to determine the position of said cell edge crossing along said axis by referring a first sequence of gray level values for a group of successive pixels including said reference pixel to a lookup facility, said lookup facility responsive to different sequences of gray level values to enable resolution of said ambiguity based on the order and relative magnitudes of gray level values of said first sequence; and
   (c) deriving cell position data for said image cell using the position of said cell edge crossing as determined in step (b).

14. A method as in claim 13, additionally comprising the following step:
   (d) utilizing said cell position data from step (c) to provide a virtual image of said image cell.

15. A method as in claim 14, wherein steps (a), (b) and (c) are repeated for additional image cells of said pixel data image and step (d) provides a virtual image of said pixel data image in its entirety.

16. A method as in claim 15, wherein said image cell first referred to represents a minimum image dimension of interest and certain of said additional image cells are included in image elements of larger dimensions.

17. A method as in claim 13, wherein said gray level values are determined on a scale of 0 to 255, and a gray scale value of 153 is correspondingly representative of a pixel which is 60 percent inside a low-reflectance cell and 40 percent outside said cell.

18. A method as in claim 13, wherein step (b) comprises utilizing said step (a) data for successive combinations of three successive pixels along said first axis for deriving normalized cell edge position data for each cell edge lying along said first axis.

19. A method as in claim 13, wherein each pixel of said pixel data image has a basic shape which is one of the following: square, round, rectangular, hexagonal.

20. A method as in claim 13, additionally comprising the following step prior to step (a):
   (x) normalizing the resolution of said pixel data image by one of the following (i) reducing said resolution to a predetermined pixels-per-cell target resolution, and (ii) if said resolution corresponds to said target resolution, retaining said resolution.

21. A method as in claim 13, additionally comprising the following step between steps (a) and (b):
   (y) normalizing gray level values for non-rectangular pixels to enable the gray level value for a pixel to be correlated to gray level values for other pixels of said plurality of successive pixels.

22. A method as in claim 13, additionally comprising the following step between steps (b) and (c):
   (z) repeating step (b) for a second cell coverage pixel which is intersected by a second cell edge crossing of said image cell.

23. A method for detecting the position of a cell which is an element of a machine readable dataform, comprising the steps of:
   (a) acquiring a pixel data image of said dataform, including said cell;
   (b) determining a pixels-to-cell nominal resolution of said pixel data image;
   (c) normalizing the resolution of said pixel data image by one of the following (i) reducing said nominal resolution to a pixels-per-cell target resolution, and (ii) if said nominal resolution corresponds to said target resolution, stabilizing said nominal resolution at said target resolution;
   (d) determining a gray level value for each of a plurality of successive pixels along a first axis, including cell coverage pixels intersected by cell edge crossings, each said cell coverage pixel having a gray level value representing the position of said cell edge crossing subject to an ambiguity as to the order along said first axis of complementary pixel portions of said cell coverage pixel respectively inside and outside the area of said cell in said pixel data image;
   (e) utilizing the order and magnitudes of a sequence of said gray level values for successive groupings of three successive pixels along said first axis to (i) resolve said ambiguity to determine, for each said cell coverage pixel, the order of its said complementary inside and outside portions along said first axis and (ii) to derive cell edge position data;

(f) deriving cell position data for said cell using said step (e) edge position data;

(g) repeating steps (d), (e) and (f) for additional cells of said dataform;

(h) utilizing said cell position data from step (f) to provide a virtual image of said dataform; and (i) decoding said virtual image to provide output signals representative of data originally encoded in said dataform.

24. A method as in claim 14, additionally comprising:

repeating step (a) by determining a gray level value for each of a plurality of successive pixels of said image along a second axis normal to said first axis; repeating steps (b) and (c) utilizing resulting data; and utilizing all resulting cell position data in step (d).

* * * * *